(No Model.)
R. L. STEVENS.
COMBINED TELESCOPE, MICROSCOPE, AND CAMERA.
No. 533,325.  Patented Jan. 29, 1895.
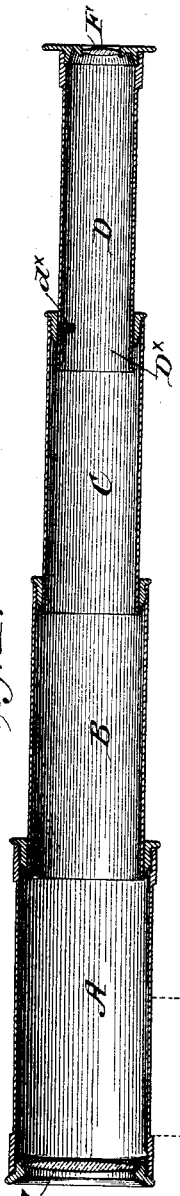
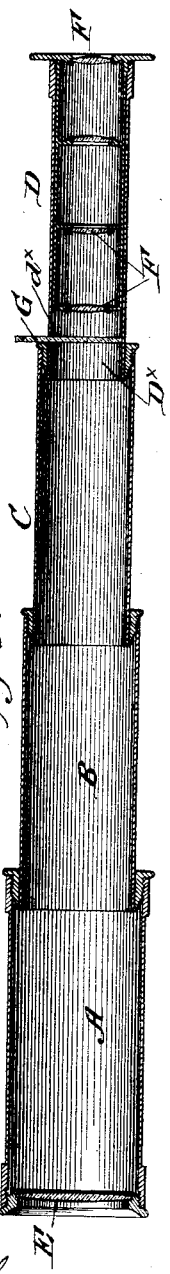
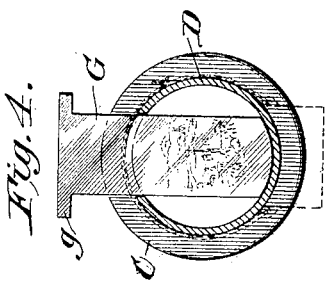
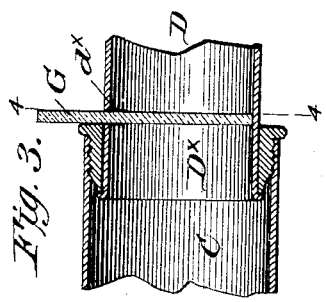
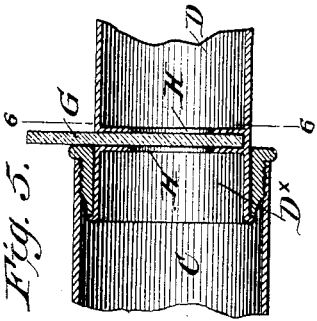
WITNESSES:
Fred G. Dieterich
M. D. Blondel
INVENTOR
Robert L. Stevens.
BY Munn & Co
ATTORNEYS.

UNITED STATES PATENT OFFICE.

ROBERT L. STEVENS, OF WARD, PENNSYLVANIA.

COMBINED TELESCOPE, MICROSCOPE, AND CAMERA.

SPECIFICATION forming part of Letters Patent No. 533,325, dated January 29, 1895.

Application filed June 30, 1894. Serial No. 516,156. (No model.)

*To all whom it may concern:*

Be it known that I, ROBERT L. STEVENS, residing at Ward, in the county of Delaware and State of Pennsylvania, have invented a new and Improved Combined Telescope, Microscope, and Camera, of which the following is a specification.

My invention relates more particularly to certain improvements in the ordinary or pocket telescopes, which will render the same capable of use either as a telescope, microscope or as a photographic camera, and such invention has primarily for its object to provide improvements of such a character which can be readily secured to or formed a part of the ordinary telescope without materially altering or changing any of its parts.

The invention also has for its object to provide a telescope having the improvements so arranged thereon, that when used for telescopic purposes, it will have the appearance of the ordinary telescope.

With other minor objects in view, which hereinafter will be apparent, the invention consists in such novel features, and construction and combination of parts as will be first described and then be pointed out in the claims, reference being had to the accompanying drawings, in which—

Figure 1 is a longitudinal section of the simplest form of a telescope with my improvements applied. Fig. 2 is a similar view of a telescope provided with the ordinary microscopic end piece. Fig. 3 is a longitudinal sectional view of a portion of the instrument on an enlarged scale. Fig. 4 is a transverse section of the same on line 4—4 Fig. 3. Fig. 5 is a longitudinal section of a modified form hereinafter referred to, and Fig. 6 is a transverse section of the same on the line 6—6 Fig. 5.

In its practical construction my improved instrument in its general contour, is of the shape substantially like that of a pocket telescope, the several telescopic draw members or sections, except the inner or eye section, being arranged and joined in the usual manner.

Referring to the accompanying drawings by letters of reference, A B C and D indicate the several telescopic or draw sections, in the outer one of which is secured the object glass E, while in the inner one D is disposed a single lens or eye piece F as shown in the simplest form in Fig. 1, or a number of microscopic lenses F F as shown most clearly in Fig. 2 the latter being the preferred form, and while I have not shown it in the drawings it is obvious the object and the eye glass ends may be provided with the ordinary cap or slide piece. The inner section D in the preferred construction is made somewhat longer than usual, that is to say it is of such a length that it can be extended outward beyond the point of its common focus adjustment, such point of adjustment in the ordinary pocket telescope being attained by drawing the eye piece or section D out to its extreme limit. The object in extending the inner section D as stated is to provide as it were a supplemental portion $D^\times$ which is slitted as at $d^\times$, which slit when the instrument is used for telescopic purposes will be held under the section C when the section D is pushed in to its common focal point, thereby keeping the light from entering through the slit, which would impair the use of the instrument, and also removing from view the slit, thereby making the instrument appear as an ordinary telescope.

G indicates a slide formed of a translucent body, on which is imprinted or carried a map, small script, or letter press, or other micro object, which slide for convenience of manipulation has a finger piece $g$. When used in connection with the form of instrument shown in Fig. 2, the picture on the slide is held or imprinted thereon in an inverted position, so that the same will appear in an upright position to the eye. The slide G when the section D is drawn out to expose the slit $d^\times$, is fitted into such slit and held in the section D as shown most clearly in Fig. 3.

So far as described it will be readily seen that as the object glass illuminates the object slide, and as such slide is held practically at the focus point of the instrument, the same will when the parts are in the position shown in Fig. 2 serve as a simple and effective microscope.

While I prefer to construct the end slide with a supplemental extension as stated, it is manifest that the section may be of the ordinary length, the slit made at a point just inside its end or stop portion, and such slit closed by any suitable slide cover or plate.

If desired the section D at the point where it is slitted may be provided with a pair of apertured diaphragms H as shown in Fig. 5 which while serving as strengthening means will also act as guides for the slides.

The slides G may in practice be carried in a pocket or supplemental casing formed on the end of the outer draw section A as indicated in dotted lines in Fig. 1, or they may be held in a separate holder strapped to such end as shown in dotted lines in Fig. 4.

By arranging the slit $d^4$ in the end piece so that, when such piece is extended to its full length, it will be practically in a true focal condition with the eye piece, it is manifest, that after the proper focus on the object is obtained (which is done by lengthening or shortening the sections B and C,) by covering the object eye lenses, and inserting a sensitized plate in the slot $a^4$ and then removing the cover from over the object glass, the object will be photographed on the said plate sharply and complete, but inverted, as in the ordinary camera. Furthermore by this arrangement the use of a ground glass for focusing is not at all necessary, as I get a focus for the photo plate by having the object to be photographed simply in good focus to the eye.

From the foregoing it will be readily seen that I provide a single instrument which can be used either as a field or spy glass, and as a microscope, and such instrument will be found specially valuable to travelers or tourists, as the slides may be provided with maps of the surrounding country over which they may be traveling, or with scenic photographs of such parts of the country, or for taking negatives of the same on sensitive slides.

Having thus described my invention, what I claim, and desire to secure by Letters Patent, is—

1. A telescope having a fixed focal point and an opening or slot at such point whereby a sensitized plate may be inserted transversely across the said focal point as and for the purposes described.

2. A telescope having its microscopic end portion formed with a cross slit or opening, and provided with a stop arranged to limit the outward movement of such end portion when the said slit reaches the true focal point, all arranged substantially as shown and described.

3. A telescope having an opening at or near the focus point, and a slide adapted to be fitted in such opening having a map or other micro object thereon, as and for the purposes described.

4. An instrument formed of telescopic sections, the outer one having an object glass, the inner a microscopic lens, a slit formed in the inner section at or near the focal point, and a translucent slide or plate adapted to be inserted in such slit, having a map or other micro object thereon as specified.

5. In an instrument as described, the combination with the draw or section having the object glass, of the micro or eye section having a slit at the front end adapted to be held under the preceding draw portion or section when the eye section is adjusted to its common focus point, and a translucent slide having a map or other micro object thereon adapted to be detachably fitted in such slit substantially as shown and for the purposes described.

6. In an instrument as described the combination with the sections A B and C, the section A having an object glass of the microscope section D having a supplemental portion $D^\times$ held under the section C when the said section D is adjusted to its common focal distance said portion $D^\times$ having a slit $d^\times$ and the plate or slide E formed of a translucent body, and having a map or other micro object thereon, said plate adapted to be inserted into the slit when the section D is drawn out to its full limit as specified.

7. The combination with the front sections of a spy or field glass, of an inner or micro section having at its front end a slit $d^\times$, and apertured diaphragms H H held in the section at each side of the slit, and a translucent plate or slide having a micro object adapted to be detachably fitted through the slit between the diaphragms all substantially as shown and for the purposes specified.

ROBERT L. STEVENS.

Witnesses:
J. W. HAWLEY,
FRANK B. RHODES.